US012695556B2

(12) United States Patent
Yang et al.

(10) Patent No.: US 12,695,556 B2
(45) Date of Patent: Jul. 28, 2026

(54) COMMUNICATION INFORMATION SENDING METHOD, COMMUNICATION INFORMATION RECEIVING METHOD, AND COMMUNICATION DEVICE

(71) Applicant: VIVO MOBILE COMMUNICATION CO., LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 393 days.

(21) Appl. No.: 18/137,807

(22) Filed: Apr. 21, 2023

(65) Prior Publication Data

US 2023/0261815 A1 Aug. 17, 2023

Related U.S. Application Data

(63) Continuation of application No. PCT/CN2021/124911, filed on Oct. 20, 2021.

(30) Foreign Application Priority Data

Oct. 23, 2020 (CN) .......................... 202011149923.5

(51) Int. Cl.
*G06N 3/04* (2023.01)
*H04L 5/00* (2006.01)
(Continued)

(52) U.S. Cl.
CPC .............. *H04L 5/001* (2013.01); *H04L 41/16* (2013.01); *H04W 24/02* (2013.01)

(58) Field of Classification Search
CPC ............. H04W 72/0446; H04W 72/04; H04W 72/231; H04W 72/23; H04W 72/232;
(Continued)

(56) References Cited

U.S. PATENT DOCUMENTS

2018/0324595 A1 11/2018 Shima
2018/0330518 A1* 11/2018 Choi ......................... A61B 8/14
(Continued)

FOREIGN PATENT DOCUMENTS

CN 105070293 A 11/2015
CN 107203807 A 9/2017
(Continued)

OTHER PUBLICATIONS

ZTE et al., "Applications of Artificial Intelligence in MIMO Networks", 3GPP TSG RAN Meeting #89e, Electronic Meeting, Sep. 14-18, 2020, RP-201771.

*Primary Examiner* — Quan M Hua
(74) *Attorney, Agent, or Firm* — The Webb Law Firm

(57) ABSTRACT

A communication information sending method includes dividing, by a first communication device, first communication information into one or more pieces of sub-band information; and inputting broadband information of the first communication information and/or the one or more pieces of sub-band information to a first artificial intelligence network model, and sending second communication information output by the first artificial intelligence network model.

13 Claims, 7 Drawing Sheets

(51) Int. Cl.
*H04L 41/16* (2022.01)
*H04W 24/02* (2009.01)

(58) Field of Classification Search
CPC ..... H04W 16/14; H04W 48/12; H04W 56/00;
H04W 48/10; H04W 72/046; H04W
74/0808; H04W 24/04; H04W 24/08;
H04W 28/26; H04W 52/24; H04W
56/001; H04W 56/0015; H04W 72/1263;
H04W 72/1273; H04W 72/21; H04W
72/30; H04W 72/542; H04W 72/56;
H04W 74/0825; H04W 74/0833; H04W
74/0891; H04W 76/15; H04W 8/00;
H04W 8/005; H04W 16/28; H04W
72/044; H04W 72/0453; H04W 72/541;
H04W 8/24; H04W 80/02
See application file for complete search history.

(56) References Cited

U.S. PATENT DOCUMENTS

| | | | |
|---|---|---|---|
| 2019/0187718 A1* | 6/2019 | Zou ................. | G06V 30/19173 |
| 2019/0274108 A1 | 9/2019 | O'Shea et al. | |
| 2019/0349943 A1 | 11/2019 | Wu et al. | |
| 2020/0153535 A1* | 5/2020 | Jayaweera Kankanamge ............. | |
| | | | G06V 10/82 |
| 2020/0372412 A1 | 11/2020 | Garcia-Morchon et al. | |
| 2021/0103818 A1 | 4/2021 | Du et al. | |
| 2021/0319286 A1 | 10/2021 | Gunduz | |
| 2021/0397927 A1* | 12/2021 | Chen ........................ | G06N 3/09 |

FOREIGN PATENT DOCUMENTS

| | | | | | |
|---|---|---|---|---|---|
| CN | 107347208 | A | 11/2017 | | |
| CN | 108449286 | A | 8/2018 | | |
| CN | 109245861 | A | 1/2019 | | |
| CN | 109919315 | A | 6/2019 | | |
| CN | 110995327 | A | 4/2020 | | |
| CN | 111223493 | A | 6/2020 | | |
| CN | 111614439 | A | * | 9/2020 | ............. G06N 3/044 |
| CN | 112446463 | A | | 3/2021 | |
| EP | 3543917 | A1 | | 9/2019 | |
| JP | 2019164793 | A1 | | 9/2019 | |
| KR | 20190098107 | A | * | 8/2019 | .............. G06N 3/08 |
| WO | 2019134802 | A1 | | 7/2019 | |
| WO | WO-2020035683 | A1 | * | 2/2020 | .............. G06N 3/02 |

* cited by examiner

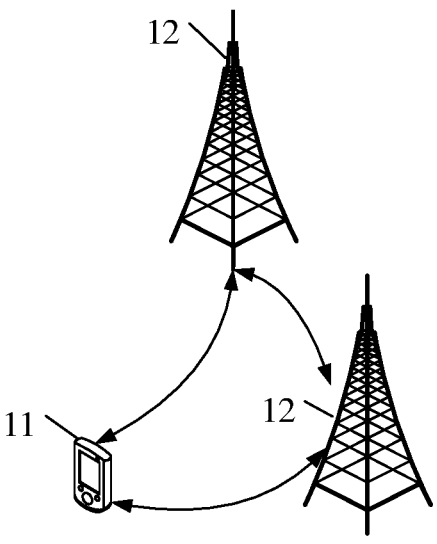

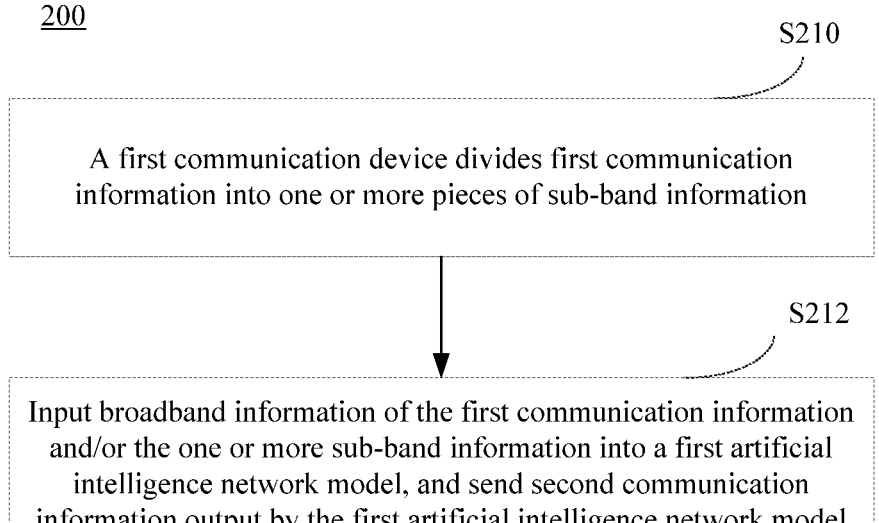

A first communication device divides first communication information into one or more pieces of sub-band information

S212

Input broadband information of the first communication information and/or the one or more sub-band information into a first artificial intelligence network model, and send second communication information output by the first artificial intelligence network model

A second communication device receives second communication information sent by a first communication device

S712

Input the second communication information into a second artificial intelligence network model

COMMUNICATION INFORMATION SENDING METHOD, COMMUNICATION INFORMATION RECEIVING METHOD, AND COMMUNICATION DEVICE

CROSS-REFERENCE TO RELATED APPLICATIONS

This application is a Bypass Continuation Application of PCT/CN2021/124911 filed Oct. 20, 2021, and claims priority to Chinese Patent Application No. 202011149923.5 filed Oct. 23, 2020, the disclosures of which are hereby incorporated by reference in their entireties.

BACKGROUND OF THE INVENTION

Field of the Invention

This application pertains to the field of wireless communication technologies, and specifically relates to a communication information sending and receiving method and a communication device.

Description of Related Art

Currently, an Artificial Intelligence (AI) network (also referred to as a neural network) is widely used in various fields.

However, there is currently no better solution for using the AI network in transmission of communication information.

SUMMARY OF THE INVENTION

According to a first aspect, a communication information sending method is provided, and the method includes: A first communication device divides first communication information into one or more pieces of sub-band information, inputs broadband information of the first communication information and/or the one or more pieces of sub-band information to a first artificial intelligence network model, and sends second communication information output by the first artificial intelligence network model.

According to a second aspect, a communication information sending apparatus is provided, including: s preprocessing module, configured to divide first communication information into one or more pieces of sub-band information; a first input module, configured to input broadband information of the first communication information and/or the one or more pieces of sub-band information into a first artificial intelligence network model; and a sending module, configured to send second communication information output by the first artificial intelligence network model.

According to a third aspect, a communication information receiving method is provided, and the method includes: A second communication device receives second communication information sent by a first communication device, and inputs the second communication information into a second artificial intelligence network model, to obtain broadband information of first communication information and/or one or more pieces of sub-band information.

According to a fourth aspect, a communication information receiving apparatus is provided, including: a receiving module, configured to receive second communication information sent by a first communication device; and a second input module, configured to input the second communication information into a second artificial intelligence network model, to obtain broadband information of first communication information and/or one or more pieces of sub-band information.

According to a fifth aspect, a communication device is provided. The communication device includes a processor, a memory, and a program or an instruction that is stored in the memory and that is executable on the processor, and when the program or the instruction is executed by the processor, steps of the method described in the first aspect are implemented, or steps of the method described in the third aspect are implemented.

According to a sixth aspect, a non-transitory readable storage medium is provided. The non-transitory readable storage medium stores a program or an instruction, and when the program or the instruction is executed by a processor, steps of the method described in the first aspect are implemented, or steps of the method described in the third aspect are implemented.

According to a seventh aspect, a chip is provided. The chip includes a processor and a communication interface, the communication interface is coupled to the processor, and the processor is configured to run a program or an instruction of a communication device, to implement the method described in the first aspect or the method described in the third aspect.

According to an eighth aspect, a computer program product is provided. The computer program product includes a processor, a memory, and a program or an instruction that is stored in the memory and that may be executable the processor, and when the program or instruction is executed by the processor, steps of the method described in the first aspect are implemented, or steps of the method described in the third aspect are implemented.

BRIEF DESCRIPTION OF THE DRAWINGS

FIG. 1 is a block diagram of a wireless communication system to which an embodiment of this application is applicable;

FIG. 2 is a flowchart of a communication information sending method according to an embodiment of this application;

DESCRIPTION OF THE INVENTION

Figure 3:
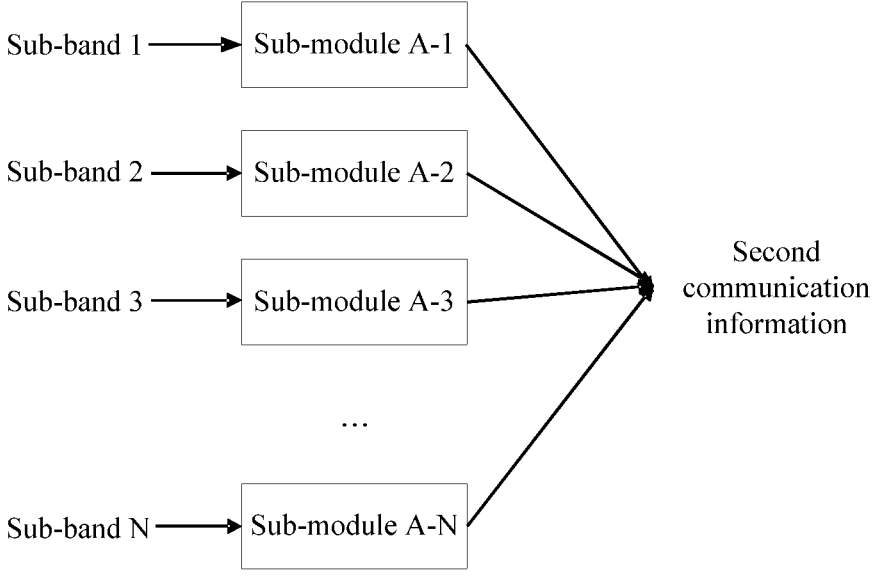
FIG. 3 is a schematic structural diagram of a first artificial intelligence network model according to an embodiment of this application.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art shall fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "I" generally represents an "or" relationship between associated objects.

It should be noted that the technology described in the embodiments of this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. A New Radio (NR) system is described below as an example, and the term NR is used in most of the descriptions, although these technologies can also be used in an application other than an application of the NR system, for example, a sixth ($6^{th}$ Generation, 6G) communication system.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle-mounted device (VUE), or a pedestrian terminal (PUE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved Node B, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another suitable term in the field provided that a same technical effect is achieved. The base station is not limited to a specific technical term. It should be noted that, in this application, only a base station in an NR system is used as an example, but a specific type of the base station is not limited.

With reference to the accompanying drawings, a communication information method provided in embodiments of this application is described in detail below by using a specific embodiment and an application scenario thereof.

FIG. 2 is a schematic flowchart of a communication information sending method according to an embodiment of this application. The method 200 may be performed by a communication device. In other words, the method may be performed by software or hardware installed on the communication device. In this embodiment of this application, the communication device may be a terminal or a network side device. As shown in FIG. 2, the method may include the following steps:

S210: A first communication device divides first communication information into one or more pieces of sub-band information.

In a possible implementation of this embodiment of this application, sub-band division may be performed based on a frequency domain resource, a time domain resource, a spatial domain resource, a code domain resource, or the like. Therefore, in this possible implementation, S210 may include: Divide the first communication information into the one or more pieces of sub-band information according to a target resource of the first communication information, where the target resource includes at least one of the following: a frequency domain resource, a time domain resource, a spatial domain resource, or a code domain resource.

In specific application, optionally, the first communication information may be divided into the one or more pieces of sub-band information by using a predetermined resource size as a unit. Therefore, in a possible implementation, that the first communication device divides the first communication information into the one or more pieces of sub-band information includes at least one of the following:

(1) The first communication information is divided into the one or more pieces of sub-band information on the frequency domain resource by using a frequency domain unit resource as a unit, where the frequency domain unit resource includes at least one of the following: a resource block (RB), a physical resource block (PRB), a sub-band, a precoding resource block group (PRG), or a bandwidth part (BWP). In other words, in this possible implementation, the first communication information may be divided according to RBs, PRBs, PRG, sub-bands, or BWPs, and information on each or multiple RBs, PRBs, PRG, sub-bands, or BWPs of the first communication information may be divided into one sub-band.

(2) The first communication information is divided into the one or more pieces of sub-band information on the time domain resource by using a time domain unit resource as a unit, where the time domain unit resource includes at least one of the following: a subcarrier, an orthogonal frequency division multiplex (OFDM) symbol, a slot, or a half-slot. In other words, in this possible implementation, the first communication information may be divided according to sub-carriers, OFDM symbols, slots, or half-slots, and information on each or multiple carriers, OFDM symbols, slots, or half-slots of the first communication information may be divided into one sub-band.

(3) The first communication information is divided into the one or more pieces of sub-band information on the spatial domain resource by using a spatial domain unit resource as a unit, where the spatial domain unit resource includes at least one of the following: an antenna, an antenna element, an antenna panel, a sending/receiving unit, a beam (including an analog beam and a digital beam), a layer, a rank, or an antenna angle (such as a tilt angle). In other words, in this possible implementation, the first communication information may be divided according to an antenna, an antenna element, an antenna panel, a sending and receiving unit, a beam (including an analog beam and a digital beam), a layer, a rank, and an antenna angle (such as a tilt angle).

(4) The first communication information is divided into the one or more pieces of sub-band information on the code domain resource by using a code domain unit resource as a unit, where the code domain unit resource includes at least one of the following: an orthogonal code, a quasi-orthogonal code, or a semi-orthogonal code. In other words, in this possible implementation, the first communication information may be divided according to an orthogonal code, a quasi-orthogonal code, and a semi-orthogonal code.

S212: Input broadband information of the first communication information and/or the one or more sub-band information into a first artificial intelligence network model, and send second communication information output by the first artificial intelligence network model.

In this embodiment of this application, the first artificial intelligence network (which may also be referred to as a neural network) model is used to process the input broadband information of the first communication information and/or the one or more pieces of sub-band information, to output the second communication information corresponding to the first communication information, that is, to-be-sent information. For example, the first artificial intelligence network model may encode the one or more pieces of sub-band information based on the broadband information of the first communication information to output a sub-band encoded data stream (that is, the second communication information), where the first communication information may be an original signal. The broadband information of the first communication information may be information representing an overall feature of the first communication information.

In specific application, the first artificial intelligence network model may be a pre-established network model, and a data stream corresponding to the input information may be output through training.

In a possible implementation, the first artificial intelligence network model may include at least one level of sub-module, and each level of sub-module may include one or more sub-modules.

For example, in a structure of a first artificial intelligence network model shown in FIG. 3, the first artificial intelligence network model includes a first-level sub-module, and the first-level sub-module includes N sub-modules, that is, sub-modules A-1 to A-N, where N is an amount of input broadband information and/or sub-bands. For example, in FIG. 3, N sub-bands are input. Certainly, this is not limited thereto. In actual application, one piece of broadband information and N-1 pieces of sub-band information may be input.

Figure 4:
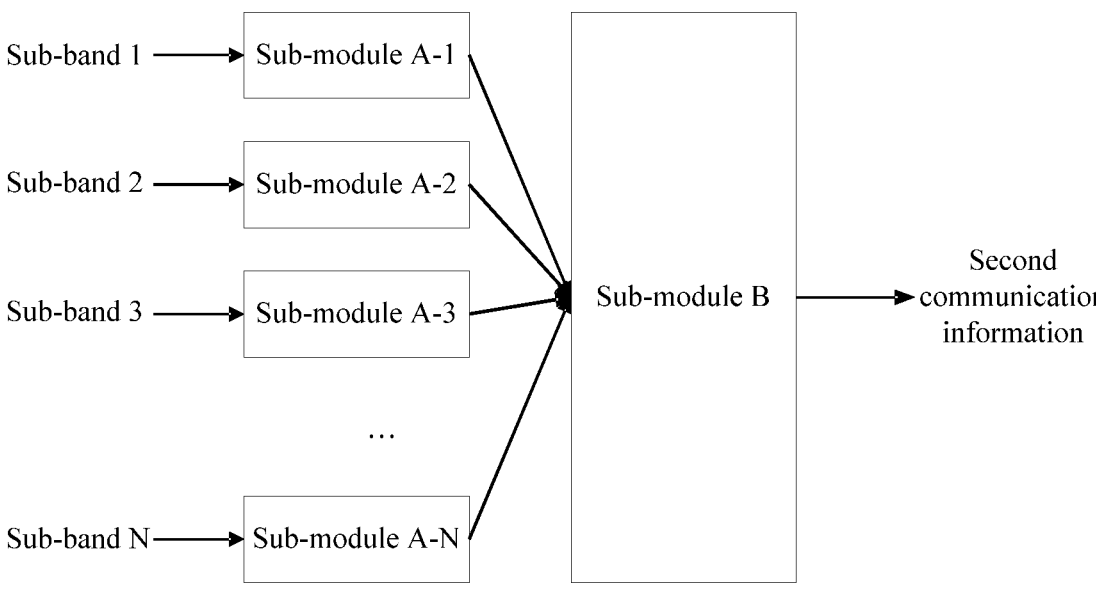
FIG. 4 is a schematic structural diagram of another first artificial intelligence network model according to an embodiment of this application.

Alternatively, in a structure of a first artificial intelligence network model shown in FIG. 4, the first artificial intelligence network model includes two levels of sub-modules, where a first level of sub-module includes N modules, that is, sub-modules A-1 to A-N, and a second level of sub-module includes one sub-module, that is, a sub-module B. Optionally, the first artificial intelligence network model includes multiple levels of sub-modules, for example, there are further a sub-module C and a sub-module D after the sub-module B.

In a possible implementation, the sub-module may include at least one of the following:

(1) a fully-connected neural network module, that is, an artificial intelligence network type used by the sub-module is a fully-connected neural network;

(2) a convolutional neural network module, that is, an artificial intelligence network type used by the sub-module is a convolutional neural network;

(3) a recurrent neural network module, that is, an artificial intelligence network type used by the sub-module is a cyclic neural network;

(4) a residual neural network module, that is, an artificial intelligence network type used by the sub-module is a residual neural network; or (5) a preset algorithm module, for example, an algorithm module for calculating time correlation and/or frequency correlation based on input information, decomposing an eigenvalue, calculating an eigenvalue, calculating an eigenvector, calculating a channel capacity, filtering, or equalization.

In specific application, one sub-module may include multiple small networks, and each small network may use one of the foregoing modules. Different small networks may use different modules. This is not specifically limited in this embodiment of this application.

In specific application, some sub-modules in the first artificial intelligence network model may use a same artificial intelligence network structure and/or use a same artificial intelligence network parameter.

For example, in FIG. 4, a sub-module A-i and a sub-module A-j use a same AI network structure, but specific weight values and offset values are different. Alternatively, a sub-module A-i and a sub-module A-j use a same AI network structure, and specific weight values and offset values are the same. Alternatively, AI network structures of a sub-module A-i and a sub-module B are different, and specific weight values and offset values are also different. i=1, 2, 3, . . . , and N, j=1, 2, 3, . . . , and N, and i≠j.

In this embodiment of this application, the artificial intelligence network structure used by the sub-module is determined by at least one of the following:

(1) an artificial intelligent network type, for example, a fully-connected neural network, a convolutional neural network, a cyclic neural network, or a residual network;

(2) a combination manner of multiple included sub-networks, that is, in a case that one sub-module includes multiple small networks, a combination manner of the small networks, for example, full connection+convolution, or convolution+residual;

(3) a quantity of hidden layers;

(4) a connection manner between an input layer and a hidden layer;

(5) a connection manner between multiple hidden layers;

(6) a connection manner between a hidden layer and an input layer; or (7) a quantity of neurons at each layer, where quantities of neurons at different layers at generally different, or may be the same.

In a possible implementation, current input information of one target sub-module of the first artificial intelligence network model includes at least one of the following:

(1) current input information of another sub-module of a same level as the target sub-module, that is, input information of the target sub-module may include current input information of another sub-module except the target sub-module of a same level, that is, the input information is an input of the target sub-module and one or more other sub-modules of the same level as the target sub-module;

(2) input information at a previous moment of another sub-module of a same level as the target sub-module, that is, the input information at the previous moment refers to input information before the current time, for example, previous input information;

(3) current intermediate information of another sub-module of a same level as the target sub-module;

(4) intermediate information at a previous moment of another sub-module of a same level as the target sub-module;

(5) current output information of another sub-module of a same level as the target sub-module;

(6) output information at a previous moment of another sub-module of a same level as the target sub-module, where the output information at the previous moment refers to output information before the current time, for example, previous output information; or (7) a combination of output information of multiple sub-modules at a previous level of the target sub-module.

In the foregoing possible implementation, another sub-module of the same level is M sub-modules adjacent to the target sub-module, and M is a positive integer. Alternatively, another sub-module of the same level is M sub-modules that are adjacent to the target sub-module after skipping some sub-modules. For example, if the target sub-module is A-5, other sub-modules of the same level are A-7 and A-3, or A-1 and A-3, and A-7 and A-9 and A-11, and M is a positive integer. Alternatively, the another sub-module of the same level includes all other sub-modules of the same level except the target sub-module.

For example, in FIG. 4, input information of the sub-module A-i includes previous intermediate information of a sub-module A-j of a current level, or further includes current input information of a sub-module A-j of a current level. i=1, 2, 3, . . . , and N, j=1, 2, 3, . . . , and N, and i≠j.

In this embodiment of this application, optionally, the first artificial intelligence network model may have one or more last-level sub-modules. Correspondingly, the second communication information may be output information of the last-level sub-module of the first artificial intelligence network model, or a combination of output information of multiple last-level sub-modules of the first artificial intelligence network model.

In an optional implementation of this embodiment of this application, the combination of the output information of the multiple sub-modules may include a one-dimensional vector, a two-dimensional matrix, or a multi-dimensional matrix obtained after the output information of the multiple sub-modules is combined. For example, in FIG. 3, output information of the multiple sub-modules A-i may be combined into a large one-dimensional vector, a two-dimensional matrix, or a multi-dimensional matrix as a direct input. For another example, in FIG. 4, output information of multiple sub-modules A-i may be combined into a large one-dimensional vector, a two-dimensional matrix, or a multidimensional matrix directly input as an input of a next level, for example, as an input of a sub-module B.

In another optional implementation of this embodiment of this application, the combination of output information of the multiple sub-modules may include a result obtained after the output information of the multiple sub-modules is calculated according to a preset algorithm. The preset algorithm includes but is not limited to weighting and/or another mathematical operation. For example, the weighting may include a combination of linear averaging, multiplicative averaging, and other common averaging methods. The mathematical operation may include a combination of various mathematical operations such as addition/subtraction/multiplying/division, $N^{th}$ power, an $n^{th}$ square root, logarithm, calculating a derivation, and calculating a derivative. n is any number. For example, n may be a positive number, a negative number, or 0, or may be a real number or a complex number. This is not specifically limited in this embodiment.

In a possible implementation, the first artificial intelligence network model includes a first-level sub-module and a second-level sub-module, where the first-level sub-module includes one or more first sub-modules, the second-level sub-module is located at a previous level of the first-level sub-module, and the second-level sub-module includes N second sub-modules, where N is an amount of broadband information and/or a quantity of sub-bands that are input into the first artificial intelligence network model.

For example, in FIG. 4, the first artificial intelligence network model includes a first-level sub-module (including a sub-module B) and a second-level sub-module (including sub-modules A-1, A-2, . . . , and A-N).

Figure 5:
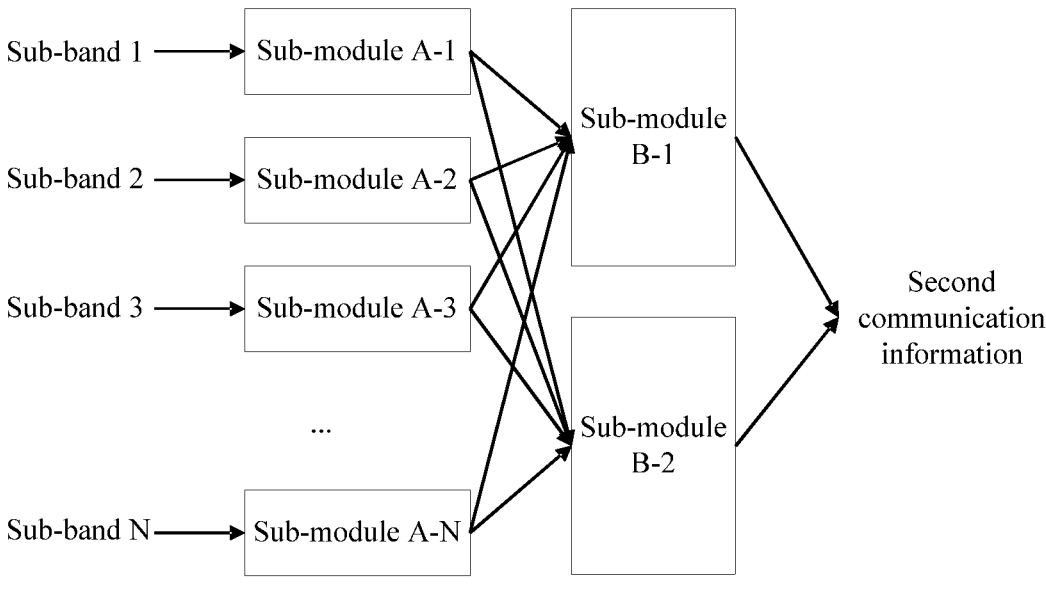
FIG. 5 is a schematic structural diagram of still another first artificial intelligence network model according to an embodiment of this application.

Alternatively, in FIG. 5, the first artificial intelligence network model includes a first-level sub-module (including a sub-module B-1 and a sub-module B-2) and a second-level sub-module (including sub-modules A-1, A-2, . . . , and A-N).

In a possible implementation, the first-level sub-module includes multiple first sub-modules, at least one first sub-module in the multiple first sub-modules represents bandwidth information, and another first sub-module in the multiple first sub-modules represents sub-band information, where the another first sub-module is some or all of the multiple first sub-modules except the at least one first sub-module.

For example, if the second communication information is a precoding matrix indicator (PMI), the PMI is classified into a wideband PMI and a sub-band PMI, or may be referred to as broadband information or a bandwidth part of the PMI, or sub-band information or a sub-band part of the PMI.

For example, in FIG. 5, the sub-module B-1 represents the broadband information, and the sub-module B-2 represents the sub-band information. Optionally, the sub-module B-2 may be further divided into multiple sub-modules, for example, a sub-module B-2-1, a sub-module B-2-2, . . . , and a sub-module B-2-L, where L is a positive integer. Optionally, L is equal to a sub-band quantity N.

Optionally, broadband information of the second communication information is obtained by using the at least one first sub-module. For example, in FIG. 5, full broadband information of the second communication information may be obtained by using an output of the sub-module B-1 (an output of the sub-module B-2 is not needed), that is, a full bandwidth feature of the second communication information.

Optionally, sub-band information of the second communication information is obtained by using the at least one first sub-module and the another first sub-module. In other words, without the output of the at least one first sub-module, the sub-band information of the second communication information cannot be obtained only by using the another first sub-module. For example, in FIG. 5, there is no output of the sub-module B-1, and the sub-band information of the second communication information cannot be obtained only by using the sub-module B-2.

Optionally, the sub-band information of the second communication information is obtained by using the another first sub-module. In other words, the sub-band information of the second communication information may be obtained only by using the another first sub-module. For example, in FIG. 5, there is no output of the sub-module B-1, and the sub-band information of the second communication information may be obtained only by using the sub-module B-2.

In a possible implementation, input information of the at least one first sub-module is output information of some or all of the second sub-modules, and input information of the another first sub-module is output information of some or all of the second sub-modules. Optionally, the input information of the at least one first sub-module may be different from the input information of the another first sub-module. For example, in FIG. 5, the input information of the sub-module B-1 may be output information of some sub-modules A (that is, some sub-modules in A-1 to A-N), and the input information of the sub-module B-2 may be output information of some sub-modules A (that is, some sub-modules in A-1 to A-N). The input information of the sub-module B-1 may be the same as or different from the input information of the sub-module B-2. For example, the input information of the sub-module B-1 may be output information of all sub-modules A (that is, all sub-modules in A-1 to A-N), and when the sub-module B-2 may be further divided into multiple sub-modules, for example, a sub-module B-2-1, a sub-module B-2-2, . . . , and a sub-module B-2-L, and the input information of the sub-module B-2-i is a sub-module A-i, where i=1, 2, 3, . . . , and N.

In the foregoing possible implementation, optionally, the first artificial intelligence network model further includes a third-level sub-module, and the third-level sub-module is located at a previous level of the second-level sub-module.

Figure 6:
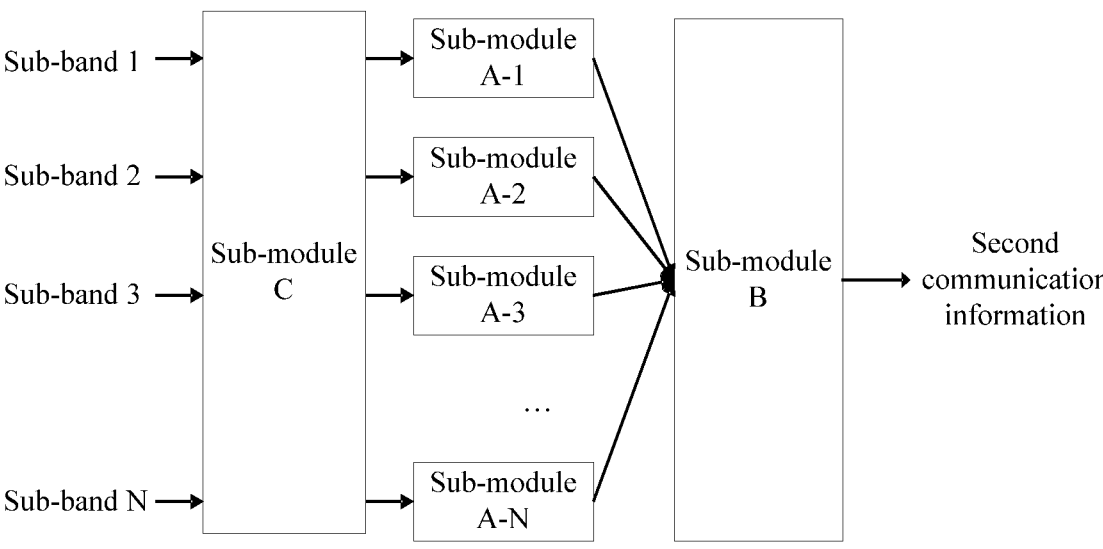
FIG. 6 is a schematic structural diagram of still another first artificial intelligence network model according to an embodiment of this application.

For example, in FIG. 6, the first artificial intelligence network model further includes a sub-module C, and the sub-module C is located at a previous level of the sub-modules A-1 to A-N.

Optionally, the third-level sub-module includes a third sub-module, and input information of the third sub-module is broadband information of the first communication information and/or the one or more pieces of sub-band information. For example, in FIG. 6, input information of the sub-module C is N pieces of sub-band information of the first communication information. In other words, in this possible implementation, the broadband information of the first communication information and/or the one or more pieces of sub-band information are first processed by the third sub-module, and then output to the second-level sub-module.

In this possible implementation, input information of each second sub-module in the second-level sub-module may be the same or different. Alternatively, input information of one second sub-module in the second-level sub-module may be all output information of the third sub-module, or input information of one second sub-module in the second-level sub-module may be some output information of the third sub-module.

Optionally, input information of one second sub-module is all output information of the third sub-module. In other words, the output information of the third sub-module is used as input information of each second sub-module at a subsequent level of the third sub-module.

Alternatively, input information of the second sub-module is some output information of the third sub-module, and input information of different second sub-modules is different. For example, in FIG. 6, input information of the sub-module C includes N parts, and each part is used as input information of one sub-module A-i. Optionally, one sub-module A-i corresponds to one piece of sub-band information i.

Alternatively, in another possible implementation, in FIG. 6, the first artificial intelligence network model may not include the first-level sub-module, that is, does not include the sub-module B, or does not include the sub-module B-1 and the sub-module B-2.

In a possible implementation of this embodiment of this application, the second communication information includes one of the following:

(1) A reference signal, that is, a reference signal used for signal processing. For example, reference signals used for signal detection, filtering, equalization, and the like may be included. The reference signal includes but is not limited to a demodulation reference signal (DMRS), a sounding reference signal (SRS), a synchronization signal/a physical broadcast channel signal block (or a synchronization signal block) (SSB), a tracking reference signal (TRS), a phase TRS (PTRS), a channel state information (CSI) reference signal (CSI-RS), and the like.

(2) A signal carried on a channel, where the channel includes but is not limited to a physical downlink control channel (PDCCH), a physical downlink shared channel (PDSCH), a physical uplink control channel (PUCCH), a physical uplink shared channel (PUSCH), a physical random access channel (PRACH), a physical broadcast channel (PBCH), and the like.

(3) Channel state information.

For example, the channel state information may include:

(3-1) channel state information feedback information, including but not limited to channel-related information, channel matrix-related information, channel feature information, channel matrix feature information, PMI, a rank indicator (RI), a CSI-RS resource indicator (CRI), a channel quality indicator (CQI), a layer indicator (LI), and the like; and (3-2) channel state information of partial reciprocity of an uplink and a downlink of frequency division duplex (FDD).

For an FDD system, according to partial reciprocity, a base station obtains angle information and delay information based on an uplink channel, and may notify UE of the angle information and the delay information by using a CSI-RS precoding or direct indication method, and the UE performs reporting according to an instruction of the base station or performs selection and reporting within a range indicated by the base station, thereby reducing a calculation amount of the UE and CSI reporting overheads.

(4) Beam information, including but not limited to beam quality, beam indication information (for example, a reference signal ID), beam failure indication information, and new beam indication information in beam failure recovery, where the beam information may be further used for beam management, including beam measurement, beam reporting, beam prediction, beam failure detection, beam failure recovery, and new beam indication in beam failure recovery.

(5) Channel prediction information, which may include channel state information prediction, beam prediction, and the like.

(6) Interference information, including but not limited to information such as intra-cell interference, inter-cell interference, out-of-band interference, and intermodulation interference.

(7) Positioning information.

(8) Track information.

A network side device may estimate a specific location of the UE (including horizontal and/or vertical locations) or a possible future track, or auxiliary location estimation or track estimation information by using a reference signal (for example, an SRS).

(9) Prediction information of a higher layer service and prediction information of a higher layer parameter and management information of a higher layer service and management information of a higher layer parameter, including but not limited to a throughput, a required packet size, a service requirement, a moving speed, noise information, and the like.

(10) Control signaling, for example, related signaling of power control or related signaling of beam management.

In this embodiment of this application, to-be-sent second communication information may be obtained by using the first artificial intelligence network model. In addition, a structure of the first artificial intelligence network model is relatively simple, so that complexity of an AI network can be effectively reduced, thereby improving performance of the communication system.

Figures 7, 8:
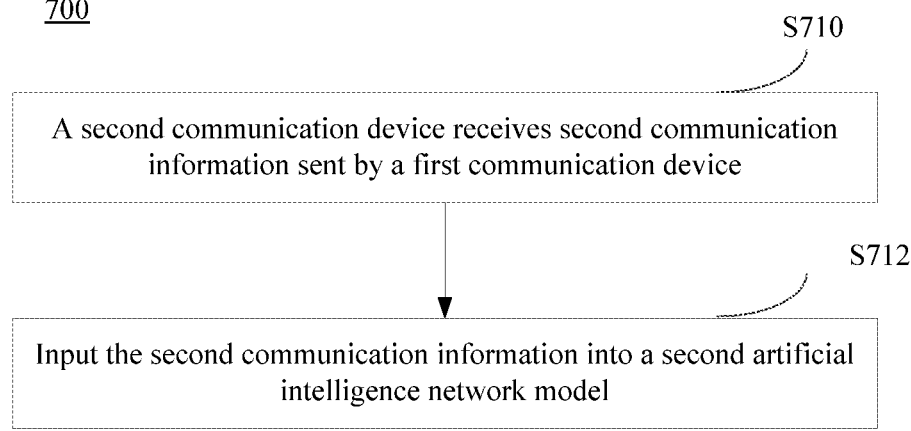
FIG. 7 is a flowchart of a communication information receiving method according to an embodiment of this application.
FIG. 8 is a schematic structural diagram of a second artificial intelligence network model according to an embodiment of this application.

FIG. 7 is a schematic flowchart of a communication information receiving method according to an embodiment of this application. The method 700 may be performed by a communication device. In other words, the method may be performed by software or hardware installed on the communication device. In this embodiment of this application, the communication device may be a terminal or a network side device. As shown in FIG. 7, the method may include the following steps:

S710: A second communication device receives second communication information sent by a first communication device.

In this embodiment of this application, the first communication device may send the second communication information by using the foregoing method 200, or the first communication device may send the second communication information in another manner. This is not specifically limited in this embodiment.

In this embodiment of this application, the second communication information may be an encoded data stream.

S712: Input the second communication information into a second artificial intelligence network model, to obtain broadband information of first communication information and/or one or more pieces of sub-band information.

In this embodiment of this application, the second artificial intelligence network model is configured to decode the received second communication information to obtain the broadband information of the first communication information and/or the one or more pieces of sub-band information. The second artificial intelligence network model may be pre-trained, so that the second artificial intelligence network model may output the broadband information and/or the one or more pieces of sub-band information corresponding to the input second communication information.

In a possible implementation, after obtaining the broadband information and/or the one or more pieces of sub-band information of the first communication information, the second communication device may further restore a distribution status of the sub-band information based on the broadband information and the one or more pieces of sub-band information, and restore original information, that is, the first communication information by means of time-frequency conversion.

In this embodiment of this application, the second artificial intelligence network model may use an artificial intelligence network model similar to the first artificial intelligence network model. The following mainly describes some content of the second artificial intelligence network model. Another part is similar to or corresponds to the first artificial intelligence network model. For details, refer to descriptions of the first artificial intelligence network model in method 200. Details are not described herein again.

In a possible implementation, the second artificial intelligence network model includes at least one level of sub-module, and each level includes one or more sub-modules.

For example, in FIG. 8, the second artificial intelligence network model includes two levels of sub-modules, where a first-level sub-module includes one sub-module B, and a second-level sub-module includes N sub-modules A, that is, A-1 to A-N, where N is an amount of broadband information of the first communication information and/or an amount of one or more pieces sub-band information.

In a possible implementation, the sub-module may include at least one of the following:

(1) a fully-connected neural network module;

(2) a convolutional neural network module;

(3) a recurrent neural network module;

(4) a residual neural network module; or (5) a preset algorithm module.

In a possible implementation, some sub-modules of the second artificial intelligence network model may use a same artificial intelligence network structure and/or use a same artificial intelligence network parameter.

In a possible implementation, an artificial intelligence network structure used by the sub-module is determined by at least one of the following:

(1) an artificial intelligence network type;

(2) a combination manner of multiple included sub-networks;

(3) a quantity of hidden layers;

(4) a connection manner between an input layer and a hidden layer;

(5) a connection manner between multiple hidden layers;

(6) a connection manner between a hidden layer and an input layer; or (7) a quantity of neurons at each layer.

In a possible implementation, current input information of one target sub-module of the second artificial intelligence network model includes at least one of the following:

(1) current input information of another sub-module of a same level as the target sub-module;

(2) input information at a previous moment of another sub-module of a same level as the target sub-module;

(3) current intermediate information of another sub-module of a same level as the target sub-module;

(4) intermediate information at a previous moment of another sub-module of a same level as the target sub-module;

(5) current output information of another sub-module of a same level as the target sub-module;

(6) output information at a previous moment of another sub-module of a same level as the target sub-module; or (7) a combination of output information of multiple sub-modules at a previous level of the target sub-module.

In a possible implementation, the combination of outputs of the multiple sub-modules includes:

(1) a one-dimensional vector, a two-dimensional matrix, or a multi-dimensional matrix obtained after the output information of the multiple sub-modules is combined; or (2) a result obtained after the output information of the multiple sub-modules is calculated according to a preset algorithm. For details, refer to related descriptions in the method 200.

In a possible implementation, the second artificial intelligence network model may include a first-level sub-module and a second-level sub-module, where the first-level sub-module includes at least one first sub-module, the second-level sub-module is located at a previous level of the first-level sub-module, and the second-level sub-module includes N second sub-modules, where N is an amount of broadband information and/or sub-band information that is output by the second artificial intelligence network model.

In the foregoing possible implementation, optionally, the first-level sub-module includes multiple first sub-modules, at least one first sub-module in the multiple first sub-modules represents bandwidth information, and another first sub-module in the multiple first sub-modules represents sub-band information, where the another first sub-module is some or all of the multiple first sub-modules except the at least one first sub-module.

For example, the input information of the at least one first sub-module may be full broadband information of the second communication information, that is, the input information of the another first sub-module may include the full broadband information of the second communication information and sub-band information of the second communication information.

In a possible implementation, input information of one second sub-module includes output information of the at least one first sub-module and/or output information of the another first sub-module.

For example, the output information of the at least one first sub-module is N parts that are separately input into each second sub-module, and the output information of the another first sub-module is N parts that are separately input into each second sub-module.

In a possible implementation, the second artificial intelligence network model further includes a third-level sub-module, and the third-level sub-module is located at a subsequent level of the second-level sub-module. By using the third-level sub-module, output information of each second sub-module in the second-level sub-module may be output after unified processing.

In the foregoing implementation, the third-level sub-module may include one third sub-module, and output information of the third sub-module is the broadband information of the first communication information and/or the one or more pieces of sub-band information.

In the foregoing possible implementation, optionally, the input information of the third sub-module is a combination of output information of multiple second sub-modules. For example, the input information of the third sub-module may be a one-dimensional vector, a two-dimensional matrix, or a multi-dimensional matrix obtained after the output information of each second sub-module is combined, or information obtained after weighted averaging is performed on output information of each second sub-module.

In a possible implementation manner, similar to the method 200, the second communication information includes one of the following:

a reference signal;

a signal carried on a channel;

channel state information;

beam information;

channel prediction information;

interference information;

positioning information;

track information;

prediction information of a higher layer service and prediction information of a higher layer parameter;

management information of a higher layer service and management information of a higher layer parameter; and control signaling.

For details, refer to related descriptions in the method 200.

It should be noted that, in the communication information sending method provided in this embodiment of this application may be performed by a communication information sending apparatus or a control module that is in the communication information sending apparatus and that is configured to perform the communication information sending method. In this embodiment of this application, an example in which the communication information sending apparatus performs the communication information sending method is used to describe the communication information sending apparatus provided in this embodiment of this application.

Figure 9:
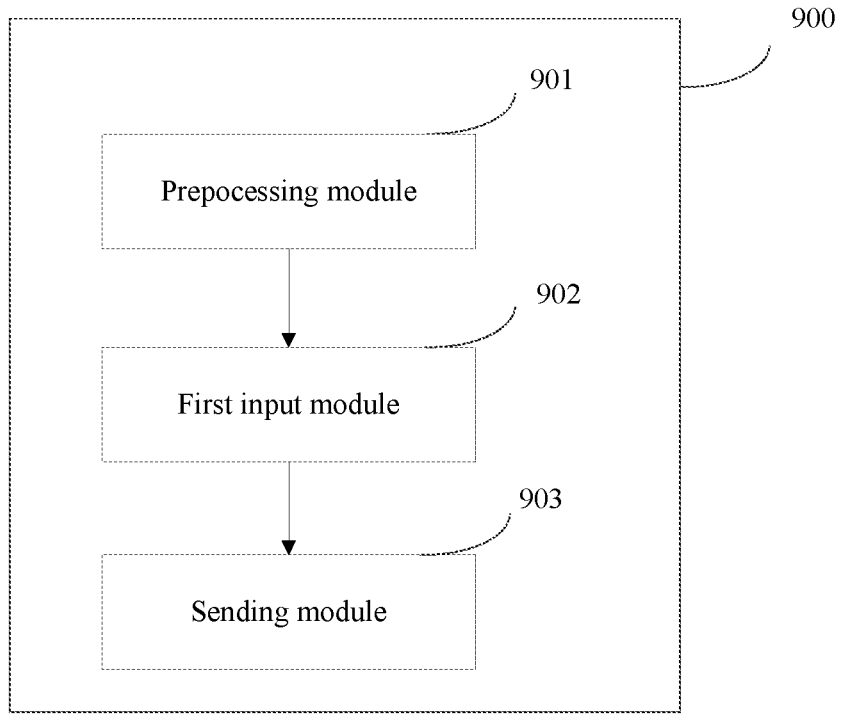
FIG. 9 is a schematic structural diagram of a communication information sending apparatus according to an embodiment of this application.

FIG. 9 is a schematic structural diagram of a communication information sending apparatus according to an embodiment of this application. As shown in FIG. 9, the communication information sending apparatus 900 may include: s preprocessing module 901, configured to divide first communication information into one or more pieces of sub-band information; a first input module 902, configured to input broadband information of the first communication information and/or the one or more pieces of sub-band information into a first artificial intelligence network model; and a sending module 903, configured to send second communication information output by the first artificial intelligence network model.

In a possible implementation, that the preprocessing module 901 divides the first communication information into the one or more pieces of sub-band information includes:

dividing the first communication information into the one or more pieces of sub-band information according to a target resource of the first communication information, where the target resource includes at least one of the following: a frequency domain resource, a time domain resource, a spatial domain resource, or a code domain resource.

In a possible implementation, that the preprocessing module 901 divides the first communication information into the one or more pieces of sub-band information includes one of the following:

dividing the first communication information into the one or more pieces of sub-band information on the frequency domain resource by using a frequency domain unit resource as a unit, where the frequency domain unit resource includes at least one of the following: a resource block RB, a physical resource block PRB, a sub-band, a precoding resource block group PRG, or a bandwidth part BWP;

dividing the first communication information into the one or more pieces of sub-band information on the time domain resource by using a time domain unit resource as a unit, where the time domain unit resource includes at least one of the following: a subcarrier, an OFDM symbol, a slot, or a half-slot;

dividing the first communication information into the one or more pieces of sub-band information on the spatial domain resource by using a spatial domain unit resource as a unit, where the spatial domain unit resource includes at least one of the following: an antenna, an antenna element, an antenna panel, a sending/receiving unit, a beam, a layer, a rank, or an antenna angle; and dividing the first communication information into the one or more pieces of sub-band information on the code domain resource by using a code domain unit resource as a unit, where the code domain unit resource includes at least one of the following: an orthogonal code, a quasi-orthogonal code, or a semi-orthogonal code.

In a possible implementation, the first artificial intelligence network model includes at least one level of sub-module, and each level includes one or more sub-modules.

In a possible implementation, the sub-module includes at least one of the following: a fully-connected neural network module; a convolutional neural network module; a recurrent neural network module; a residual neural network module; or a preset algorithm module.

In a possible implementation, some sub-modules use a same artificial intelligence network structure and/or use a same artificial intelligence network parameter.

In a possible implementation, an artificial intelligence network structure used by the sub-module is determined by at least one of the following:

an artificial intelligence network type;

a combination manner of multiple included sub-networks;

a quantity of hidden layers;

a connection manner between an input layer and a hidden layer;

a connection manner between multiple hidden layers;

a connection manner between a hidden layer and an input layer; or a quantity of neurons at each layer.

In a possible implementation, current input information of one target sub-module of the first artificial intelligence network model includes at least one of the following:

current input information of another sub-module of a same level as the target sub-module;

input information at a previous moment of another sub-module of a same level as the target sub-module;

current intermediate information of another sub-module of a same level as the target sub-module;

intermediate information at a previous moment of another sub-module of a same level as the target sub-module;

current output information of another sub-module of a same level as the target sub-module;

output information at a previous moment of another sub-module of a same level as the target sub-module; or a combination of output information of multiple sub-modules at a previous level of the target sub-module.

In a possible implementation, the second communication information includes: output information of a last-level sub-module of the first artificial intelligence network model;

or a combination of output information of multiple last-level sub-modules of the first artificial intelligence network model.

In a possible implementation, the combination of the output information of the multiple sub-modules includes:

a one-dimensional vector, a two-dimensional matrix, or a multi-dimensional matrix obtained after the output information of the multiple sub-modules is combined; or a result obtained after the output information of the multiple sub-modules is calculated according to a preset algorithm.

In a possible implementation, the first artificial intelligence network model includes a first-level sub-module and a second-level sub-module, where the first-level sub-module includes one or more first sub-modules, the second-level sub-module is located at a previous level of the first-level sub-module, and the second-level sub-module includes N second sub-modules, where N is an amount of broadband information and/or a quantity of sub-bands that are input into the first artificial intelligence network model.

In a possible implementation, the first-level sub-module includes multiple first sub-modules, at least one first sub-module in the multiple first sub-modules represents bandwidth information, and another first sub-module in the multiple first sub-modules represents sub-band information, where the another first sub-module is some or all of the multiple first sub-modules except the at least one first sub-module.

In a possible implementation, the broadband information of the second communication information is obtained by using the at least one first sub-module; and/or the sub-band information of the second communication information is obtained by using the at least one first sub-module and the another first sub-module.

In a possible implementation, input information of the at least one first sub-module is output information of some or all of the second sub-modules, and input information of the another first sub-module is output information of some or all of the second sub-modules.

In a possible implementation, the first artificial intelligence network model further includes a third-level sub-module, and the third-level sub-module is located at a previous level of the second-level sub-module.

In a possible implementation, the third-level sub-module includes one third sub-module, and input information of the third sub-module is broadband information of the first communication device and/or the one or more pieces of sub-band information.

In a possible implementation, input information of one second sub-module is all output information of the third sub-module.

In a possible implementation, input information of one second sub-module is some output information of the third sub-module, and input information of different second sub-modules is different.

In a possible implementation, the second communication information includes one of the following:

a reference signal;

a signal carried on a channel;

channel state information;

beam information;

channel prediction information;

interference information;

positioning information;

track information;

prediction information of a higher layer service and prediction information of a higher layer parameter;

management information of a higher layer service and management information of a higher layer parameter; and control signaling.

The communication information sending apparatus in this embodiment of this application may be an apparatus, or may be a component, an integrated circuit, or a chip in a terminal or a network side device. The apparatus may be a mobile terminal, or may be a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The communication information sending apparatus in this embodiment of this application may be an apparatus with an operating system. The operating system may be an Android operating system, may be an iOS operating system, or may be another possible operating system. This is not specifically limited in this embodiment of this application.

The communication information sending apparatus provided in this embodiment of this application can implement each process implemented in the method embodiment of FIG. 2, and a same technical effect is achieved. To avoid repetition, details are not described herein again.

Figure 10:
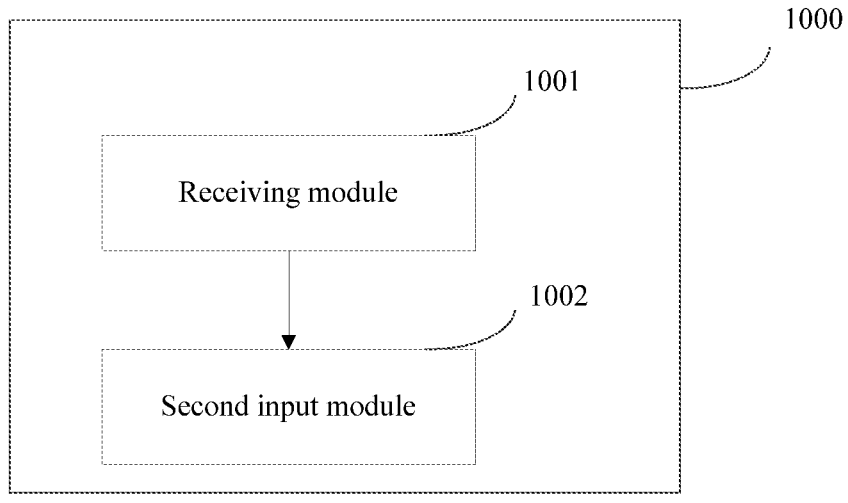
FIG. 10 is a schematic structural diagram of a communication information receiving apparatus according to an embodiment of this application.

FIG. 10 is a schematic structural diagram of a communication information receiving apparatus according to an embodiment of this application. As shown in FIG. 10, the communication information receiving apparatus 1000 may include: a receiving module 1001, configured to receive second communication information sent by a first communication device; and a second input module 1002, configured to input the second communication information into a second artificial intelligence network model, to obtain broadband information of first communication information and/or one or more pieces of sub-band information.

In a possible implementation, the second artificial intelligence network model includes at least one level of sub-module, and each level includes one or more sub-modules.

In a possible implementation, the sub-module includes at least one of the following:

a fully-connected neural network module;

a convolutional neural network module;

a recurrent neural network module;

a residual neural network module; or a preset algorithm module.

In a possible implementation, some sub-modules use a same artificial intelligence network structure and/or use a same artificial intelligence network parameter.

In a possible implementation, an artificial intelligence network structure used by the sub-module is determined by at least one of the following:

an artificial intelligence network type;

a combination manner of multiple included sub-networks;

a quantity of hidden layers;

a connection manner between an input layer and a hidden layer;

a connection manner between multiple hidden layers;

a connection manner between a hidden layer and an input layer; or a quantity of neurons at each layer.

In a possible implementation, current input information of one target sub-module of the second artificial intelligence network model includes at least one of the following:

current input information of another sub-module of a same level as the target sub-module;

input information at a previous moment of another sub-module of a same level as the target sub-module;

current intermediate information of another sub-module of a same level as the target sub-module;

intermediate information at a previous moment of another sub-module of a same level as the target sub-module;

current output information of another sub-module of a same level as the target sub-module;

output information at a previous moment of another sub-module of a same level as the target sub-module; or a combination of output information of multiple sub-modules at a previous level of the target sub-module.

In a possible implementation, the combination of the output information of the multiple sub-modules includes:

a one-dimensional vector, a two-dimensional matrix, or a multi-dimensional matrix obtained after the output information of the multiple sub-modules is combined; or a result obtained after the output information of the multiple sub-modules is calculated according to a preset algorithm.

In a possible implementation, the second artificial intelligence network model includes a first-level sub-module and a second-level sub-module, where the first-level sub-module includes at least one first sub-module, the second-level sub-module is located at a previous level of the first-level sub-module, and the second-level sub-module includes N second sub-modules, where N is an amount of broadband information and/or sub-band information that is output by the second artificial intelligence network model.

In a possible implementation, the first-level sub-module includes multiple first sub-modules, at least one first sub-module in the multiple first sub-modules represents bandwidth information, and another first sub-module in the multiple first sub-modules represents sub-band information, where the another first sub-module is some or all of the multiple first sub-modules except the at least one first sub-module.

In a possible implementation, input information of one second sub-module includes output information of the at least one first sub-module and/or output information of the another first sub-module.

In a possible implementation, the second artificial intelligence network model further includes a third-level sub-module, and the third-level sub-module is located at a subsequent level of the second-level sub-module.

In a possible implementation, the third-level sub-module includes one third sub-module, and output information of the third sub-module is the broadband information of the first communication information and/or the one or more pieces of sub-band information.

In a possible implementation, an input of the third sub-module is a combination of output information of multiple second sub-modules.

In a possible implementation, the second communication information includes one of the following:

a reference signal;

a signal carried on a channel;

channel state information;

beam information;

channel prediction information;

interference information;

positioning information;

track information;

prediction information of a higher layer service and prediction information of a higher layer parameter;

management information of a higher layer service and management information of a higher layer parameter; and control signaling.

The communication information receiving apparatus in this embodiment of this application may be an apparatus, or may be a component, an integrated circuit, or a chip in a terminal or a network side device. The apparatus may be a mobile terminal, or may be a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The communication information receiving apparatus in this embodiment of this application may be an apparatus with an operating system. The operating system may be an Android operating system, may be an iOS operating system, or may be another possible operating system. This is not specifically limited in this embodiment of this application.

The communication information receiving apparatus provided in this embodiment of this application can implement each process implemented in the method embodiment of FIG. 2, and a same technical effect is achieved. To avoid repetition, details are not described herein again.

Figure 11:
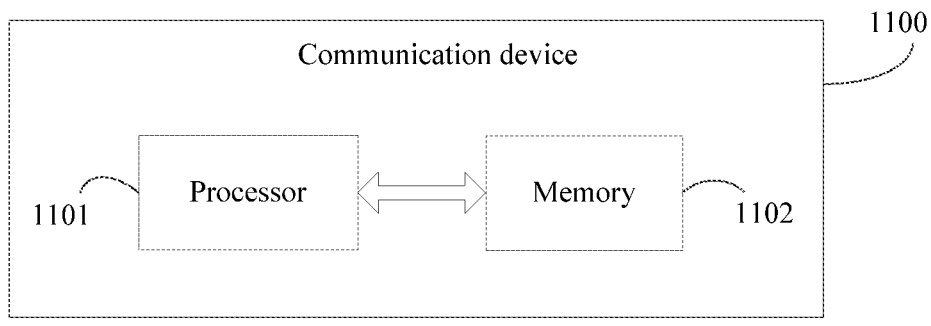
FIG. 11 is a schematic structural diagram of a communication device according to an embodiment of this application.

Optionally, as shown in FIG. 11, an embodiment of this application further provides a communication device 1100. The communication device 1100 includes a processor 1101, a memory 1102, a program or an instruction that is stored in the memory 1102 and that may be executable on the processor 1101. For example, when the communication device 1100 is a terminal or a network side device, the program or the instruction is executed by the processor 1101 to implement each process of the embodiment of the foregoing communication information sending method, or implement each process of the embodiment of the foregoing communication information receiving method, and a same technical effect can be achieved. To avoid repetition, details are not described herein again.

Figure 12:
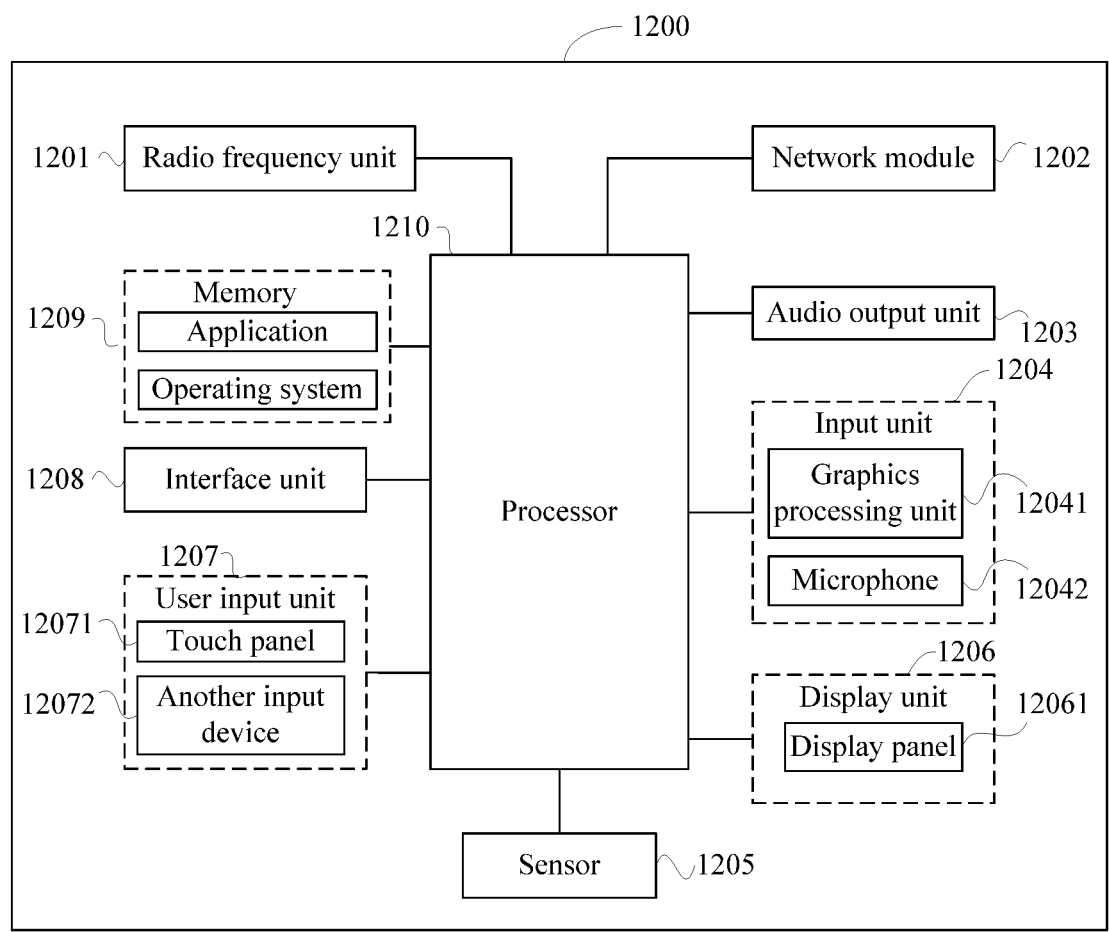
FIG. 12 is a schematic diagram of a hardware structure of a terminal according to an embodiment of this application.

FIG. 12 is a schematic diagram of a hardware structure of a terminal according to an embodiment of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It may be understood by a person skilled in the art that the terminal 1200 may further include a power supply (such as a battery) that supplies power to each component. The power supply may be logically connected to the processor 1210 by using a power management system, to implement functions such as charging, discharging, and power consumption management by using the power management system. A structure of the terminal shown in FIG. 12 does not constitute a limitation on the terminal device, and may include more or fewer parts than those shown in the figure, or combine some parts, or have different part arrangements. Details are not described herein again.

It should be understood that, in this embodiment of this application, the input unit 1204 may include a graphics processing unit (GPU) 12041 and a microphone 12042. The graphics processing unit 12041 processes image data of a static picture or a video obtained by an image capture apparatus (such as a camera) in a video capture mode or an image capture mode. The display unit 1206 may include a display panel 12061, and the display panel 12061 may be configured in a form of a liquid crystal display, an organic light emitting diode, or the like. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 1201 sends the downlink data to the processor 1210 for processing, and sends uplink data to the network side device. Generally, the radio frequency unit 1201 includes but is not limited to an antenna, at least one amplifier, a transceiver, a coupler, a low noise amplifier, a duplexer, and the like.

The memory 1209 may be configured to store a software program or an instruction and various data. The memory 1209 may mainly include a storage program or instruction area and a storage data area, where the storage program or instruction area may store an operating system, an application program or an instruction required by at least one function (such as a sound play function or an image play function), and the like. In addition, the memory 1209 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory device, or another non-volatile solid-state storage device.

The processor 1210 may include one or more processing units. Optionally, the processor 1210 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 1210.

The processor 1210 is configured to: divide first communication information into one or more pieces of sub-band information, and input broadband information of the first communication information and/or the one or more pieces of sub-band information into a first artificial intelligence network model.

The radio frequency unit 1201 is configured to send second communication information output by the first artificial intelligence network model;

or the radio frequency unit 1201 is configured to receive second communication information sent by a first communication device.

The processor 1210 is configured to input the second communication information into a second artificial intelligence network model, to obtain broadband information of first communication information and/or one or more pieces of sub-band information.

Figure 13:
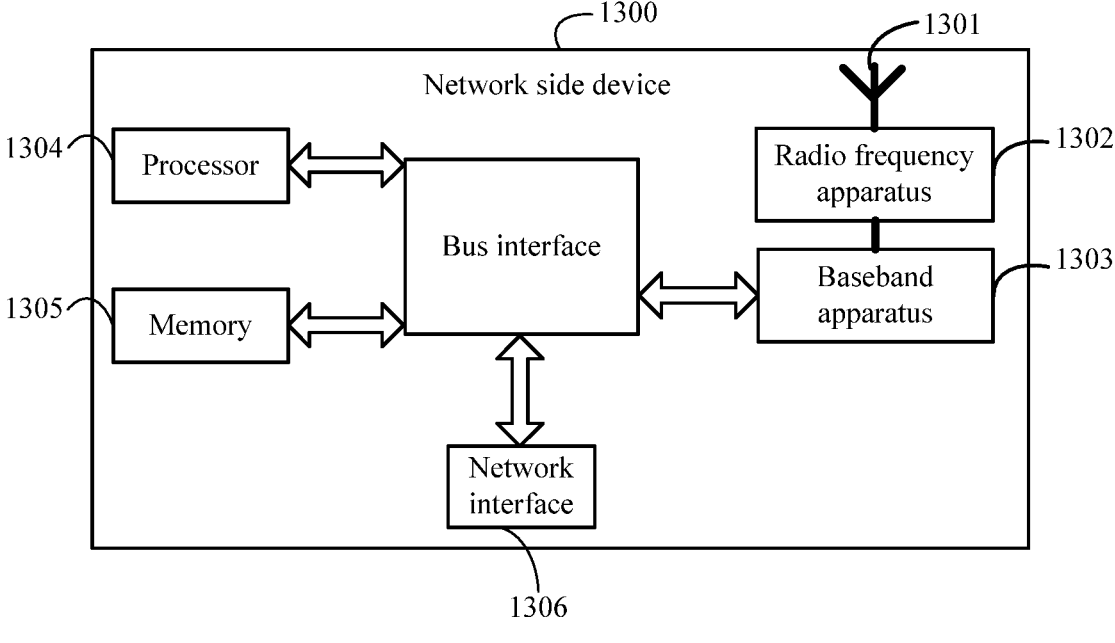
FIG. 13 is a schematic diagram of a hardware structure of a network side device according to an embodiment of this application.

For example, an embodiment of this application further provides a network side device. As shown in FIG. 13, the network device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the received information to the baseband apparatus 1303 for processing. In a downlink direction, the baseband apparatus 1303 processes to-be-sent information, and sends the to-be-sent information to the radio frequency apparatus 1302. After processing the received information, the radio frequency apparatus 1302 sends the information by using the antenna 1301.

The foregoing band processing apparatus may be located in the baseband apparatus 1303. In the foregoing embodiment, a method performed by the network side device may be implemented in the baseband apparatus 1303. The baseband apparatus 1303 includes a processor 1304 and a memory 1305.

For example, the baseband apparatus 1303 may include at least one baseband board. Multiple chips are disposed on the baseband board. As shown in FIG. 13, one chip is, for example, the processor 1304, and is connected to the memory 1305, to invoke a program in the memory 1305 to perform an operation of the network side device shown in the foregoing method embodiment.

The baseband apparatus 1303 may further include a network interface 1306, configured to exchange information with the radio frequency apparatus 1302, where the interface is, for example, a common public radio interface (common public radio interface, CPRI for short). For example, the network side device in this embodiment of this application further includes an instruction or a program that is stored in the memory 1305 and that is executable on the processor 1304. The processor 1304 invokes the instruction or the program in the memory 1305 to perform the method performed by the modules shown in FIG. 9 or FIG. 10, and a same technical effect is achieved. To avoid repetition, details are not described herein.

An embodiment of this application further provides a non-transitory readable storage medium, and the non-transitory readable storage medium stores a program or an instruction. When the program or the instruction is executed by a processor, each process of the embodiment of the communication information sending method shown in FIG. 2 to FIG. 8 is implemented, or each process of the embodiment of the communication information receiving method shown in FIG. 2 to FIG. 8 is implemented, and a same technical effect can be achieved. To avoid repetition, details are not described herein again.

The processor is a processor in the terminal in the foregoing embodiment. The non-transitory readable storage medium includes a non-transitory computer-readable storage medium such as a read-only memory (ROM), a random access memory (RAM), a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the embodiment of the foregoing communication information sending method in FIG. 2 to FIG. 8, or the processes of the embodiment of the foregoing communication information receiving method in FIG. 2 to FIG. 8, and a same technical effect can be achieved. To avoid repetition, details are not described herein again.

It should be understood that the chip mentioned in this embodiment of this application may also be referred to as a system-level chip, a system chip, a chip system, or a system on a chip.

An embodiment of this application further provides a computer program product. The computer program product includes a processor, a memory, and a program or an instruction that is stored in the memory and that may be executable on the processor. When the program or the instruction is executed by the processor, the processes of the embodiment of the foregoing communication information sending method in FIG. 2 to FIG. 8 are implemented, or the processes of the embodiment of the foregoing communication information receiving method in FIG. 2 to FIG. 8 are implemented, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

What is claimed is:

1. A communication information sending method, comprising:

dividing, by a first communication device, first communication information into one or more pieces of sub-band information; and inputting broadband information of the first communication information and/or the one or more pieces of sub-band information to a first artificial intelligence network model, and sending second communication information output by the first artificial intelligence network model; wherein the first artificial intelligence network model comprises at least one level of sub-modules, and each level comprises one or more sub-modules; some sub-modules use a same artificial intelligence network structure and/or use a same artificial intelligence network parameter;

wherein current input information of a target sub-module of the first artificial intelligence network model comprises at least one of:

current input information of another sub-module of a same level as the target sub-module;

input information at a previous moment of another sub-module of a same level as the target sub-module;

current intermediate information of another sub-module of a same level as the target sub-module;

intermediate information at a previous moment of another sub-module of a same level as the target sub-module;

current output information of another sub-module of a same level as the target sub-module; or output information at a previous moment of another sub-module of a same level as the target sub-module;

wherein the first artificial intelligence network model comprises a first-level sub-module and a second-level sub-module, wherein the first-level sub-module comprises one or more first sub-modules, the second-level sub-module is located at a previous level of the first-level sub-module, and the second-level sub-module comprises N second sub-modules, wherein N is an amount of broadband information and/or a quantity of sub-bands that are input into the first artificial intelligence network model;

wherein the first artificial intelligence network model further comprises a third-level sub-module, and the third-level sub-module is located at a previous level of the second-level sub-module;

wherein the third-level sub-module comprises one third sub-module, and input information of the third sub-module is the broadband information of the first communication information and/or the one or more pieces of sub-band information;

wherein input information of one second sub-module is all output information of the third sub-module; or input information of one second sub-module is some output information of the third sub-module, and different second sub-modules has different input information.

2. The method according to claim 1, wherein the dividing, by a first communication device, first communication information into one or more pieces of sub-band information comprises:

dividing the first communication information into one or more pieces of sub-band information according to a target resource of the first communication information, wherein the target resource comprises at least one of: a frequency domain resource, a time domain resource, a spatial domain resource, or a code domain resource.

3. The method according to claim 2, wherein the dividing, by a first communication device, first communication information into one or more pieces of sub-band information comprises at least one of:

dividing the first communication information into one or more pieces of sub-band information on the frequency domain resource by using a frequency domain unit resource as a unit, wherein the frequency domain unit resource comprises at least one of: a resource block (RB), a physical resource block (PRB), a sub-band, a precoding resource block group (PRG), or a bandwidth part (BWP);

dividing the first communication information into one or more pieces of sub-band information on the time domain resource by using a time domain unit resource as a unit, wherein the time domain unit resource comprises at least one of: a subcarrier, an orthogonal frequency division multiplexing (OFDM) symbol, a slot, or a half-slot;

dividing the first communication information into one or more pieces of sub-band information on the spatial domain resource by using a spatial domain unit resource as a unit, wherein the spatial domain unit resource comprises at least one of: an antenna, an antenna element, an antenna panel, a sending/receiving unit, a beam, a layer, a rank, or an antenna angle; or dividing the first communication information into one or more pieces of sub-band information on the code domain resource by using a code domain unit resource as a unit, wherein the code domain unit resource comprises at least one of: an orthogonal code, a quasi-orthogonal code, or a semi-orthogonal code.

4. The method according to claim 1, wherein a sub-module of the one or more sub-modules comprises at least one of:

a fully-connected neural network module;

a convolutional neural network module;

a recurrent neural network module;

a residual neural network module; or a preset algorithm module.

5. The method according to claim 4, wherein an artificial intelligence network structure used by a sub-module of the one or more sub-modules is determined by at least one of:

an artificial intelligence network type;

a combination manner of multiple comprised sub-networks;

a quantity of hidden layers;

a connection manner between an input layer and a hidden layer;

a connection manner between multiple hidden layers;

a connection manner between a hidden layer and an input layer; or a quantity of neurons at each layer.

6. The method according to claim 4, wherein the second communication information comprises output information of a last-level sub-module of the first artificial intelligence network model, or a combination of output information of multiple last-level sub-modules of the first artificial intelligence network model.

7. The method according to claim 1, wherein the first-level sub-module comprises multiple first sub-modules, at least one first sub-module in the multiple first sub-modules represents bandwidth information, and another first sub-module in the multiple first sub-modules represents sub-band information, wherein the another first sub-module is some or all of the multiple first sub-modules except the at least one first sub-module.

8. The method according to claim 7, wherein input information of the at least one first sub-module is output information of some or all of the second sub-modules, and input information of the another first sub-module is output information of some or all of the second sub-modules.

9. A communication device, being a first communication device, and comprising a processor, a memory, and a program or an instruction that is stored in the memory and that is executable on the processor, wherein the program or the instruction, when executed by the processor, causes the communication device to perform:

dividing first communication information into one or more pieces of sub-band information; and inputting broadband information of the first communication information and/or the one or more pieces of sub-band information to a first artificial intelligence network model, and sending second communication information output by the first artificial intelligence network model;

wherein the first artificial intelligence network model comprises at least one level of sub-modules, and each level comprises one or more sub-modules; some sub-modules use a same artificial intelligence network structure and/or use a same artificial intelligence network parameter;

wherein current input information of a target sub-module of the first artificial intelligence network model comprises at least one of:

current input information of another sub-module of a same level as the target sub-module;

input information at a previous moment of another sub-module of a same level as the target sub-module;

current intermediate information of another sub-module of a same level as the target sub-module;

intermediate information at a previous moment of another sub-module of a same level as the target sub-module;

current output information of another sub-module of a same level as the target sub-module; or output information at a previous moment of another sub-module of a same level as the target sub-module;

wherein the first artificial intelligence network model comprises a first-level sub-module and a second-level sub-module, wherein the first-level sub-module comprises one or more first sub-modules, the second-level sub-module is located at a previous level of the first-level sub-module, and the second-level sub-module comprises N second sub-modules, wherein N is an amount of broadband information and/or a quantity of sub-bands that are input into the first artificial intelligence network model;

wherein the first artificial intelligence network model further comprises a third-level sub-module, and the third-level sub-module is located at a previous level of the second-level sub-module;

wherein the third-level sub-module comprises one third sub-module, and input information of the third sub-module is the broadband information of the first communication information and/or the one or more pieces of sub-band information;

wherein input information of one second sub-module is all output information of the third sub-module; or input information of one second sub-module is some output information of the third sub-module, and different second sub-modules has different input information.

10. The communication device according to claim 9, wherein a sub-module of the one or more sub-modules comprises at least one of:

a fully-connected neural network module;

a convolutional neural network module;

a recurrent neural network module;

a residual neural network module; or a preset algorithm module.

11. The communication device according to claim 10, wherein an artificial intelligence network structure used by a sub-module of the one or more sub-modules is determined by at least one of:

an artificial intelligence network type;

a combination manner of multiple comprised sub-networks;

a quantity of hidden layers;

a connection manner between an input layer and a hidden layer;

a connection manner between multiple hidden layers;

a connection manner between a hidden layer and an input layer; or a quantity of neurons at each layer.

12. The communication device according to claim 10, wherein the second communication information comprises output information of a last-level sub-module of the first artificial intelligence network model, or a combination of output information of multiple last-level sub-modules of the first artificial intelligence network model.

13. The communication device according to claim 9, wherein the first-level sub-module comprises multiple first sub-modules, at least one first sub-module in the multiple first sub-modules represents bandwidth information, and another first sub-module in the multiple first sub-modules represents sub-band information, wherein the another first sub-module is some or all of the multiple first sub-modules except the at least one first sub-module.

\* \* \* \* \*